(12) United States Patent
Schoinianakis et al.

(10) Patent No.: US 11,991,297 B2
(45) Date of Patent: May 21, 2024

(54) SECURE CRYPTOPROCESSOR

(71) Applicant: Nokia Solutions and Networks Oy, Espoo (FI)

(72) Inventors: Dimitrios Schoinianakis, Munich (DE); Ian Justin Oliver, Soderkulla (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/284,576

(22) PCT Filed: Jan. 31, 2019

(86) PCT No.: PCT/EP2019/052365
§ 371 (c)(1),
(2) Date: Apr. 12, 2021

(87) PCT Pub. No.: WO2020/078591
PCT Pub. Date: Apr. 23, 2020

(65) Prior Publication Data
US 2021/0258174 A1  Aug. 19, 2021

(30) Foreign Application Priority Data
Oct. 17, 2018 (GR) .............................. 20180100472

(51) Int. Cl.
*H04L 9/32* (2006.01)
*H04L 9/08* (2006.01)

(52) U.S. Cl.
CPC .......... *H04L 9/3278* (2013.01); *H04L 9/0822* (2013.01); *H04L 9/085* (2013.01); *H04L 9/321* (2013.01); *H04L 9/3242* (2013.01)

(58) Field of Classification Search
CPC ..... H04L 9/3278; H04L 9/0822; H04L 9/085; H04L 9/321; H04L 9/3242
(Continued)

(56) References Cited

U.S. PATENT DOCUMENTS 8,694,778 B2 * 4/2014 Teuwen ................ H04L 9/3278
713/168
8,762,723 B2 * 6/2014 Yu ......................... H04L 9/0844
713/169
(Continued)

FOREIGN PATENT DOCUMENTS

| CN | 104321777 A | 1/2015 |
| WO | 2006/038183 A1 | 4/2006 |

(Continued)

OTHER PUBLICATIONS

Office Action received for corresponding Indian Patent Application No. 202147020850, dated Feb. 23, 2022, 7 pages.
(Continued)

*Primary Examiner* — Samson B Lemma
(74) *Attorney, Agent, or Firm* — Laine IP Oy

(57) ABSTRACT

According to an example aspect of the present invention, there is provided a cryptoprocessor comprising physical unclonable function circuitry comprising at least one physical unclonable function, and at least one processing core configured to process a challenge received from outside the cryptoprocessor by at least deriving a response to the challenge by providing the challenge as input to the physical unclonable function circuitry, using the response as an encryption key to encrypt a second encryption key, and by causing the encrypted second encryption key to be provided to a party which issued the challenge.

15 Claims, 7 Drawing Sheets

(58) Field of Classification Search
USPC ......................................................... 713/164
See application file for complete search history.

(56) References Cited

U.S. PATENT DOCUMENTS

| | | | | |
|---|---|---|---|---|
| 9,672,342 | B2* | 6/2017 | Walsh | G06F 21/32 |
| 10,009,325 | B1* | 6/2018 | David | H04L 63/0464 |
| 10,013,543 | B2* | 7/2018 | Walsh | H04L 9/3226 |
| 11,736,460 | B2* | 8/2023 | Cambou | H04L 9/0825 713/168 |
| 2012/0131340 | A1* | 5/2012 | Teuwen | H04L 9/3273 713/168 |
| 2015/0195088 | A1* | 7/2015 | Rostami | H04L 9/3278 380/28 |
| 2015/0318994 | A1* | 11/2015 | Walsh | G06F 21/32 713/182 |
| 2017/0270288 | A1 | 9/2017 | Walsh et al. | |
| 2018/0145838 | A1* | 5/2018 | Wang | H04L 9/3278 |
| 2019/0149324 | A1* | 5/2019 | Kong | H04L 9/0819 713/171 |
| 2020/0052898 | A1* | 2/2020 | Wentz | H04L 9/3278 |
| 2020/0076829 | A1* | 3/2020 | Wentz | H04L 63/0823 |
| 2020/0201679 | A1* | 6/2020 | Wentz | H04L 63/1433 |
| 2021/0160065 | A1* | 5/2021 | Hunacek | H04L 9/0841 |
| 2021/0365592 | A1* | 11/2021 | Rabbani | H04L 9/0877 |

FOREIGN PATENT DOCUMENTS

| | | |
|---|---|---|
| WO | 2013/006785 A2 | 1/2013 |
| WO | 2013/101085 A1 | 7/2013 |
| WO | WO2015178597 A1 * | 11/2015 |
| WO | WO-2015178597 A1 * | 11/2015 ............... H04L 9/08 |

OTHER PUBLICATIONS

"Information Technology—Trusted Platform Module Library—Part 1: Architecture", ISO/IEC 11889-1, Second edition, Dec. 15, 2015, 278 pages.

"Information Technology—Trusted Platform Module Library—Part 2: Structures", ISO/IEC 11889-2, Second edition, Dec. 15, 2015, 178 pages.

"Information Technology—Trusted Platform Module Library—Part 3: Commands", ISO/IEC 11889-3, Second edition, Dec. 15, 2015, 484 pages.

"Information Technology—Trusted Platform Module Library—Part 4: Supporting Routines", ISO/IEC 11889-4, Second edition, Dec. 15, 2015, 576 pages.

"Information Technology—Trusted Platform Module—Part 1: Overview", ISO/IEC 11889-1, First edition, May 15, 2009, 20 pages.

"Information Technology—Trusted Platform Module—Part 2: Design principles", ISO/IEC 11889-2, First edition, May 15, 2009, 152 pages.

"Information Technology—Trusted Platform Module—Part 3: Structures", ISO/IEC 11889-3, First edition, May 15, 2009, 204 pages.

"Information Technology—Trusted Platform Module—Part 4: Commands", ISO/IEC 11889-4, First edition, May 15, 2009, 254 pages.

"Trusted Computing Group", Trusted Computing Group, Retrieved on Mar. 28, 2021, Webpage available at : https://trustedcomputinggroup.org/.

"Intrinsic ID's Integrated Security Solutions", Intrinsic ID, Retrieved on Mar. 28, 2021, Webpage available at : https://www.intrinsic-id.com/products/.

Anderson et al., "Low Cost Attacks on Tamper Resistant Devices", International Workshop on Security Protocols, LNCS, vol. 1361, No. 1, 1997, 12 pages.

Bar-Ei, Known Attacks Against Smartcards, White Paper, Discretix Technologies, pp. 1-19.

Suh, "Aegis: a Single-Chip Secure Processor", Thesis, Information Security Technical Report, vol. 10, No. 2, Sep. 2005, pp. 63-73.

Xu et al., "Digital Bimodal Function: an Ultra-Low Energy Security Primitive", International Symposium on Low Power Electronics and Design (ISLPED), Sep. 2013, 6 pages.

Xu et al., "Matched Digital PUFs for Low Power Security in Implantable Medical Devices", IEEE International Conference on Healthcare Informatics, Sep. 2014, pp. 33-38.

Yu et al., "Secure and Robust Error Correction for Physical Unclonable Functions", IEEE Design & Test of Computers, vol. 27, No. 1, Feb. 2010, pp. 48-64.

Yu et al., "Lightweight and Secure PUF Key Storage Using Limits of Machine Learning", International Workshop on Cryptographic Hardware and Embedded Systems, LNCS, vol. 6917, 2011, pp. 358-373.

Yu et al., "Performance Metrics and Empirical Results of a PUF Cryptographic Key Generation ASIC", IEEE International Symposium on Hardware-Oriented Security and Trust, 2012, pp. 108-115.

Choi et al., "Design of Security Enhanced TPM Chip Against Invasive Physical Attacks", IEEE International Symposium on Circuits and Systems (ISCAS), 2012, pp. 1787-1790.

Li et al., "Enhancing TPM Security by Integrating SRAM PUFs Technology", Proceedings of the 2nd ACM International Workshop on Cyber-Physical System Security (CPSS '16). May 30-Jun. 3, 2016, pp. 82-93.

Kim et al., "Better Security for Queries on Encrypted Databases", IACR Cryptology ePrint Archive, 2016, pp. 1-22.

Mutti et al., "Sesqlite: Security Enhanced Sqlite: Mandatory Access Control for Android Databases", Proceedings of the 31st Annual Computer Security Applications Conference, Dec. 7-11, 2015, pp. 411-420.

Dubey et al., "Implementing Security Technique on Generic Database", Eighth International Conference on Contemporary Computing (IC3), 2015, 7 pages.

Guo et al., "Research of Security Structure Model for Web Application Systems Based on the Relational Database", International Journal of Security and Networks, vol. 10, No. 4, 2015, pp. 207-213.

Tuyls et al., "Secret Key Generation From Classical Physics Physical Uncloneable Functions", Amlware Hardware Technology Drivers of Ambient Intelligence, PRBS, vol. 5, 2006, 20 pages.

Suh et al., "Physical Unclonable Functions for Device Authentication and Secret Key Generation", 44th ACM/IEEE Design Automation Conference, Jun. 4-8, 2007, pp. 9-14.

Guajardo et al., "Key Distribution for Wireless Sensor Networks and Physical Unclonable Functions", Secure Component and System Identification Workshop—SECSI, Mar. 17-18, 2008, pp. 1-11.

"TPM 2.0 Library", Trusted Computing Group, Retrieved on Mar. 29, 2021, Webpage available at : https://trustedcomputinggroup.org/resource/tpm-library-specification/.

International Search Report and Written Opinion received for corresponding Patent Cooperation Treaty Application No. PCT/EP2019/052365, dated Jul. 2, 2019, 11 pages.

* cited by examiner

SECURE CRYPTOPROCESSOR

RELATED APPLICATION

This application claims priority to PCT Application No. PCT/EP2019/052365, filed on Jan. 31, 2019, which claims priority to Greek Application No. 20180100472, filed on Oct. 17, 2018, each of which is incorporated herein by reference in its entirety.

FIELD

The present invention relates to secure cryptographic processing in data processing hardware.

BACKGROUND

Cryptographic methods are used to authenticate communicating parties and to secure communication between such parties. While modern cryptographic algorithms in themselves are considered to be well developed and resistant to cryptanalysis, it is often comparatively easier for an attacker to compromise one or both of the communicating endpoints. By communicating endpoint it is meant a device a communicating party is using to participate in the communication. Such an endpoint device may comprise, for example, a computer, smartphone or cellular telephone. Improving the security of such devices is therefore of interest.

SUMMARY OF THE INVENTION

According to some aspects, there is provided the subject-matter of the independent claims. Some embodiments are defined in the dependent claims.

According to a first aspect of the present invention, there is provided a cryptoprocessor comprising physical unclonable function circuitry comprising at least one physical unclonable function, and at least one processing core configured to process a challenge received from outside the cryptoprocessor by at least deriving a response to the challenge by providing the challenge as input to the physical unclonable function circuitry, using the response as an encryption key to encrypt a second encryption key, and by causing the encrypted second encryption key to be provided to a party which issued the challenge.

According to a second aspect of the present invention, there is provided a method in a cryptoprocessor, comprising deriving a response to a challenge received from outside the cryptoprocessor by providing the challenge as input to physical unclonable function circuitry of the cryptoprocessor, using the response as an encryption key to encrypt a second encryption key, and causing the encrypted second encryption key to be provided to a party which issued the challenge.

According to a third aspect of the present invention, there is provided a cryptoprocessor comprising means for deriving a response to a challenge received from outside the cryptoprocessor by providing the challenge as input to physical unclonable function circuitry of the cryptoprocessor, means for using the response as an encryption key to encrypt a second encryption key, and means for causing the encrypted second encryption key to be provided to a party which issued the challenge.

According to a fourth aspect of the present invention, there is provided a non-transitory computer readable medium having stored thereon a set of computer readable instructions that, when executed by at least one processing core of a cryptoprocessor, cause the cryptoprocessor to at least derive a response to a challenge received from outside the cryptoprocessor by providing the challenge as input to physical unclonable function circuitry of the cryptoprocessor, use the response as an encryption key to encrypt a second encryption key, and cause the encrypted second encryption key to be provided to a party which issued the challenge.

According to a fifth aspect of the present invention, there is provided a computer program configured to cause at least the following to be performed, when run by a processing core of a cryptoprocessor deriving a response to a challenge received from outside the cryptoprocessor by providing the challenge as input to physical unclonable function circuitry of the cryptoprocessor, using the response as an encryption key to encrypt a second encryption key, and causing the encrypted second encryption key to be provided to a party which issued the challenge.

According to a sixth aspect of the present invention, there is provided a system, comprising a server and a communications node which comprises a cryptoprocessor comprising physical unclonable function circuitry comprising at least one physical unclonable function, and at least one processing core configured to process a challenge received from the server by at least deriving a response to the challenge by providing the challenge as input to the physical unclonable function circuitry, using the response as an encryption key to encrypt a second encryption key, and by causing the encrypted second encryption key to be provided to the server.

EMBODIMENTS

Cryptoprocessor design may be simplified by using physical unclonable functions, PUFs, to perform at least some, and in some embodiments all, functions performed in earlier cryptoprocessors using circuitry designed for asymmetric encryption operations, such as public-key cryptosystems. Hardware reductions in cryptoprocessors may be obtained by leveraging PUFs built into the cryptoprocessors to perform tasks including key generation and establishment of secure protocol connections with applications and processors. Such a reduced-hardware footprint cryptoprocessor may find application, for example, in Internet of Things, IoT, devices.

Figure 1:
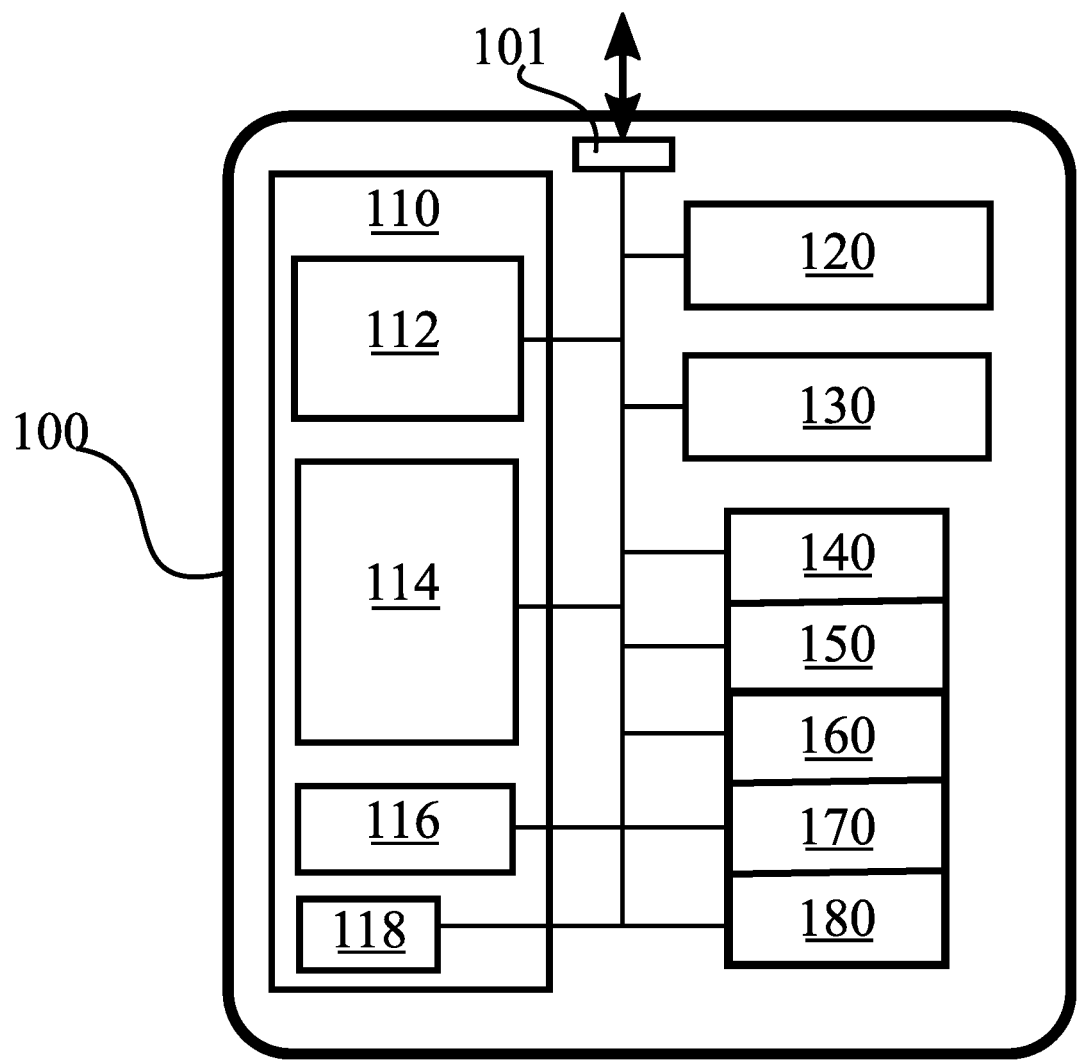
FIG. 1 illustrates an example cryptoprocessor in accordance with at least some embodiments.

FIG. 1 illustrates an example cryptoprocessor in accordance with at least some embodiments. Cryptoprocessor 100 may comprise a secure cryptoprocessor, such as a tamper-resistant cryptoprocessor, for example. The cryptoprocessor may correspond to a trusted platform module in accordance with ISO/IEC 11889, for example. The cryptoprocessor may be usable in a personal computer, PC, a mobile communication device, an embedded computing device or a virtualized platform, for example. Aspects of the cryptoprocessor may relate to technology defined by the Trusted Computing Group, TCG. Cryptoprocessor 100 comprises a secure input/output port 101, through which the cryptoprocessor may communicate with applications outside the cryptoprocessor. Such applications may reside on a same integrated chip as the cryptoprocessor, on a different integrated chip or even in a remote server, for example. Internally, cryptoprocessor 100 comprises a cryptographic module 110. Cryptographic module 110 comprises a PUF module 112, symmetric encryption engine block 114, hash engines 116 and a key generation module 118. PUF module 112 comprises, or is comprised as, PUF circuitry 112.

The PUF module 112 comprises at least one PUF. In addition to the at least one PUF, the PUF module may comprise error correction coding, ECC, accompanying the PUF or PUFs. In general, a PUF is a hardware circuit, which is typically embedded or hidden in a bigger chip, such as a cryptoprocessor, for example. As such, it may be not straightforward to find the exact physical location of the PUF, and physical tampering with the chip will alter the PUF's physical characteristics, hence it will destroy its functionality. This leads to a straightforward attack detection and prevention mechanism. PUFs offer a means for secure key-storage and device authentication, without the need for additional cryptographic hardware.

PUF module 112 may be embedded in cryptoprocessor 110 during manufacture. Cryptoprocessor 100 may be seen as an application-specific integrated circuit, ASIC. The manufacturer or any other trusted authority may hold additional challenge-response pairs to support external communication of the cryptoprocessor. A PUF may be challenged with an input signal, and the generated response will be unique to each challenge and unique per PUF due to variations in ASIC technology manufacturing. The assumption that a single authority may hold the complete model of the PUF is safe, as there exist several methodologies for secure authentication, authorization and access to databases [12], [13], [14], [15].

A physical unclonable function, or PUF, is a "digital fingerprint" that serves as a unique identity for a semiconductor device such as a microprocessor. PUFs are based on physical variations which occur naturally during semiconductor manufacturing, and which make it possible to differentiate between otherwise identical semiconductors. Typically a PUF is embodied in a physical structure as integrated circuits. In general, no two PUFs share the exact same physical characteristics due to inevitable variations in the chip manufacturing process, to which the PUFs are intentionally exposed in such a way during manufacture, that the variations affect the output the PUF will generate from a given input. This means that a PUF serves as a fingerprint-like unique identifier for each chip and can be used to derive useful cryptographic properties. For example, the two paths in the arbiter PUF of FIG. 2 have different delays due to manufacturing variations. As such, each PUF will trigger the latch to a value of 1 or 0 in a different pattern (Response) based on the corresponding Challenge signals, hence generating different responses among chips containing the same PUF. As such, the PUFs are built in such a way that the effects of manufacturing variations are not eliminated, as in a normal microprocessor which is designed to produce predictable output, but rather the functioning of the PUF will depend on such variations to generate an output characteristic of the individual chip in question. Because of these properties PUFs can be used as a unique and tamper-resistant device identifier.

Moreover, the initial seeds stored in a non-volatile memory may be unnecessary, since PUF module 120 may serve as a sole anchor point for key generation. Hence a technical benefit in terms of reduction in need of on-chip memory is achieved. Finally, using a PUF module 120 enhances the cryptoprocessors physical security against secret extraction since, by its definition, it prohibits physical tampering with the device without destroying the underlying physical components that constitute the PUF, such as capacitors and other dedicated circuitry.

As will be described herein, PUF module 112 may be used instead of a separate asymmetric engine block, such that in some embodiments, no asymmetric encryption operation circuitry needs to be included in cryptoprocessor 100. In some embodiments, use of the PUF module 112 enables cryptoprocessor 100 to be designed with a reduced quantity of circuitry dedicated to asymmetric operation.

Symmetric encryption engine block 114 may comprise circuitry designed to perform symmetric ciphers, such as block ciphers, such as advanced encryption standard, AES, or data encryption standard, DES. Block ciphers may be based on Feistel networks or substitution-permutation networks, for example. Block ciphers may be run in different modes which may have supporting circuitry in the symmetric encryption engine block 114. Such modes may include, for example, electronic codebook, ECB, cipher block chaining, CBC, cipher feedback, CFB, output feedback, OFB, and counter, CTR, modes.

Hash engines 116 may comprise at least one hash circuitry. Examples of possible hash algorithms performed by such hash circuitries include the SHA-x and HMAC algorithms. Key generation module 118 may comprise circuitry configured to generate keys to support various cryptographic procedures.

The cryptoprocessor may further comprise non-volatile memory 120, which may store, for example, at least one counter. The at least one counter may comprise at least one monotonic counter, for example. A smaller non-volatile memory may be enabled as a benefit of using the PUFs as a unique anchor point in key generation, wherefore storing seeds, such as a platform sees, an endorsement seed and/or a storage seed in non-volatile memory may become unnecessary.

The cryptoprocessor may further comprise volatile memory 130, which may store, for example, at least one of the following: platform configuration register, PCR, banks, keys which are in use and session information.

The cryptoprocessor may further comprise a random number generator 140, a management module 140, a power detection module 150, an execution engine 170 and/or an authorization module 180. An execution engine 170 may comprise at least one processing core configured to control the functioning of the cryptoprocessor, for example.

In at least some embodiments, the cryptoprocessor does not comprise circuitry configured to perform asymmetric encryption operations, such as public-key cryptography. Examples of public-key cryptography cryptosystems include the Rivest-Shamir-Adleman, RSA, and ElGamal cryptosystems. Asymmetric encryption operations may include signature generation and signature verification operations. The functionality of these encryption operations, or at least of some of them, may be replaced with PUF circuitry, as will be described herein.

While FIG. 1 illustrates an example cryptoprocessor, it is to be understood that not all cryptoprocessors in scope of the present disclosure comprise all the elements of FIG. 1. For example, some cryptoprocessors may comprise execution engine 170, memory 130 and PUF module 112, wherein the execution engine may be enabled to perform symmetric encryption and/or hashing functions, etc.

Technology in accordance with embodiments relating to the present disclosure may be used to facilitate secured sessions between devices. Such secured sessions may comprise transaction, such as monetary or legal transaction, sessions, payment sessions and facial recognition sessions. A session may be seen as an exchange of messages, the use of the term "session" does not connotate a session with any specific, especially not long, duration.

A user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. A user device may comprise a cryptoprocessor, such as the one illustrated in FIG. 1. In general, a communications node may comprise the cryptoprocessor. The communications node may comprise the user device, an edge node, an access node or a different kind of communications node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that user devices are depicted to include a variety number of reception and/or transmission antennas and may vary according to a current implementation. Additionally, although the apparatuses have been depicted as single entities, different units, processors and/or memory units may be implemented.

Figure 2:
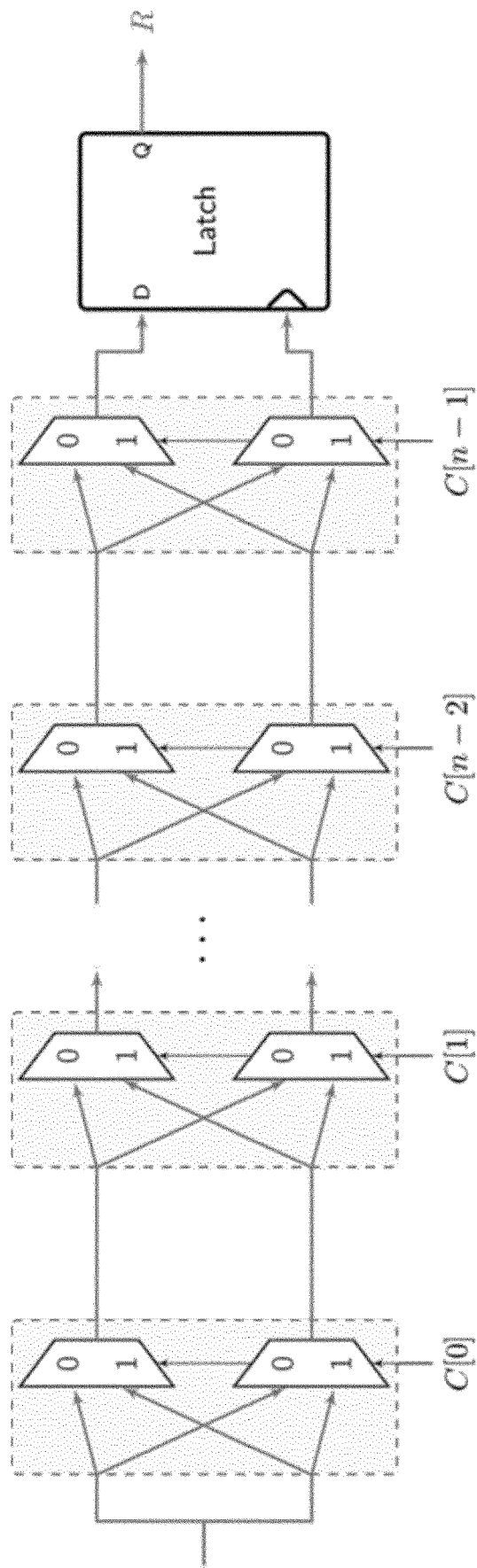
FIG. 2 illustrates an example PUF circuit.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). 5G (or new radio, NR) networks are being designed to support multiple hierarchies, where MEC servers can be placed between the core and the base station or nodeB (gNB). It should be appreciated that MEC can be applied in 4G networks as well FIG. 2 illustrates an example PUF circuit. The two paths in the arbiter PUF of FIG. 2 have different delays due to normal manufacturing variations. As such, each PUF will trigger the latch to a value of 1 or 0 in a different pattern (Response) based on the corresponding Challenge signals (C[ ]), hence generate different responses among chips containing the same PUF design.

Figure 3:
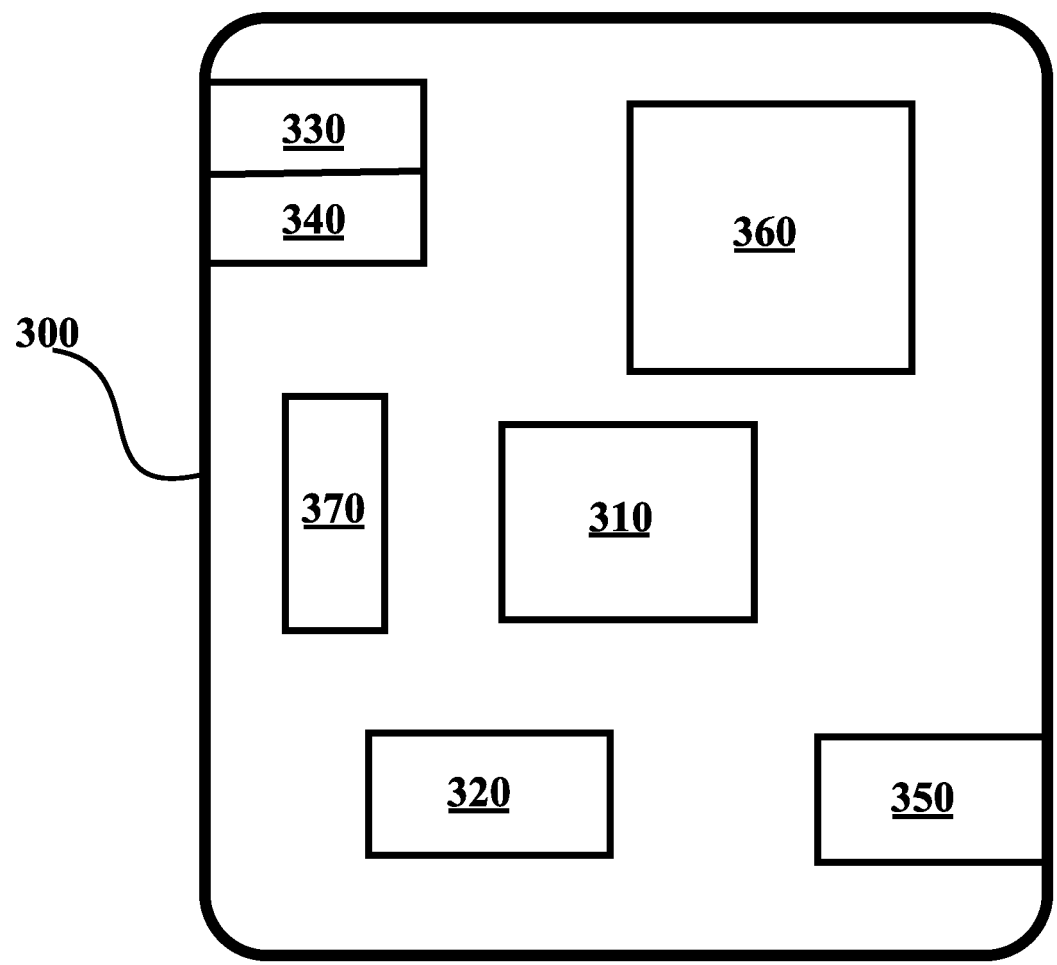
FIG. 3 illustrates an example apparatus capable of supporting at least some embodiments.

FIG. 3 illustrates an example apparatus capable of supporting at least some embodiments. Illustrated is device 300, which may comprise, for example, a mobile communication device. Comprised in device 300 is processor 310, which may comprise, for example, a single- or multi-core processor wherein a single-core processor comprises one processing core and a multi-core processor comprises more than one processing core. In particular, processor 310 may comprise a cryptoprocessor. Where processor 310 comprises a cryptoprocessor, device 300 may further be furnished with a separate application processor, which may have a higher data processing capability than the cryptoprocessor, such that the application processor may support, for example, multimedia functions. A processing core of a cryptoprocessor may resemble a processing core of a microcontroller in capability, since the main purpose of a cryptoprocessor is security, rather than processing quickly large quantities of information. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-circuit implementations, such as implementations in analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Bluetooth Low Energy, Sigfox, LoRa or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to participate in encrypted protocol connections.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is one example and depending on the embodiment various ways of interconnecting at least two of the aforementioned devices may be selected without departing from the scope of the present invention.

Figure 4:
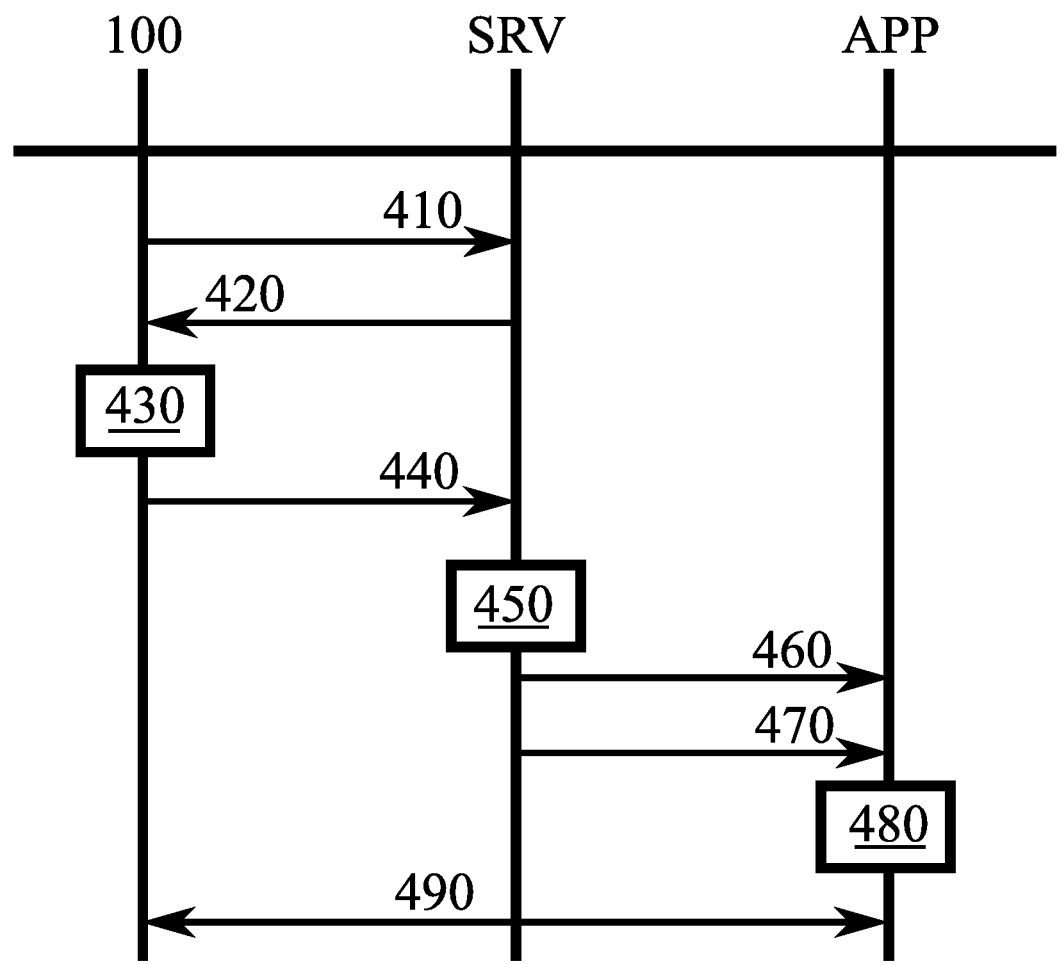
FIG. 4 illustrates signalling in accordance with at least some embodiments.

FIG. 4 illustrates signalling in accordance with at least some embodiments. The process of FIG. 4 leads to establishment of a shared secret with a correspondent party. On the vertical axes are disposed, on the left, cryptoprocessor 100 such as, for example, the one in FIG. 1, in the centre a challenge-response server SVR and on the right, an application APP. Application APP may correspond to a correspondent party. Time advances from the top toward the bottom.

In phase 410, cryptoprocessor 100 issues a request for a challenge to server SRV, which provides the requested challenge in phase 420. In phase 430, cryptoprocessor 100 uses the challenge with the PUF module to obtain a response to the challenge, the response being specific to the challenge and to the cryptoprocessor, as described herein above. Cryptoprocessor 100 then uses the response as an encryption key with a symmetric cipher to encrypt a second encryption key, the second encryption key forming part of the shared secret, or alternatively forming the entirety of the shared secret to be established with the application APP.

The encrypted second encryption key is provided to server SRV in phase 440, with server SRV decrypting the second encryption key in phase 450. Server SRV is able to perform the decrypting without receiving the response from cryptoprocessor 100, since it has a model of the PUF module of cryptoprocessor 100. Such a model may comprise a database of challenge-response pairs relating to the PUF module of the cryptoprocessor, for example.

In phases 460 and 470, server SVR provides a second challenge and the second encryption key to application APP, the second encryption key encrypted using a second response. Phases 460 and 470 may be combined into a single message.

In phase 480, application APP obtains a second response, which is a response to the second challenge, and uses it to decrypt the second encryption key. After phase 480, cryptoprocessor 100 and application APP therefore are in possession of the second encryption key, which was not communicated in the clear over any of the interfaces of FIG. 4. A similar process as phases 410-480 may be performed to share a third encryption key from the application APP side toward cryptoprocessor 100. The second and third encryption keys may then be used as the shared secret. Alternatively, the second encryption key may be used as the shared secret, or it may be used to share a larger shared secret. Once the shared secret has been established, server SRV may delete the challenges and responses it has used in the illustrated process.

As can be seen from the process described above, a shared secret may be established, using the PUFs, without using asymmetric encryption procedures. In principle a different process may be used between server SVR and application APP than described herein, since application APP may have the ability to perform asymmetric operations.

Figure 5:
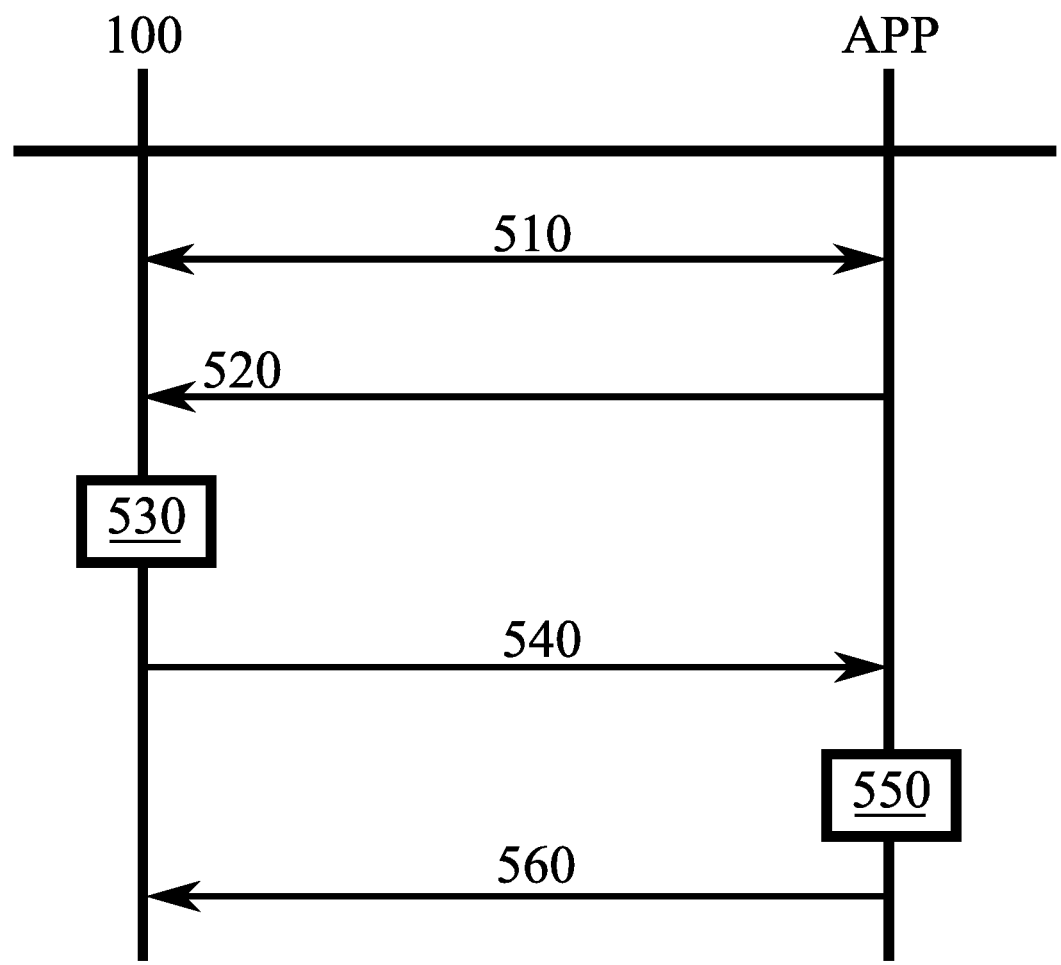
FIG. 5 illustrates signalling in accordance with at least some embodiments.

FIG. 5 illustrates signalling in accordance with at least some embodiments. The process of FIG. 5 leads to identification of legitimate and integral cryptoprocessor objects and data structures. On the vertical axes are disposed, on the left, cryptoprocessor 100 of FIG. 1, and on the right, an application APP. Application APP may correspond to an internal or external process, for example. Time advances from the top toward the bottom.

In phase 510, a shared secret is established, for example as described herein above in connection with FIG. 4. The shared secret may be used to secure communication phases of FIG. 5. In phase 520, the application requests an identification of an object of cryptoprocessor 100. For example, secret keying material may be requested to be identified. In response, in phase 530 cryptoprocessor 100 retrieves identifiers of the specified object, and derives a hash-based message authentication code, HMAC, of the object, for example with the second encryption key which is described above in connection with FIG. 4. The identifiers and the respective HMAC are communicated to the application in phase 540, and the application checks the HMAC in phase 550. In some embodiments, a different hash function is used instead of HMAC, such as SHA, for example. Cryptoprocessor 100 may, optionally, be informed of a result of the checking in optional phase 560.

Figure 6:
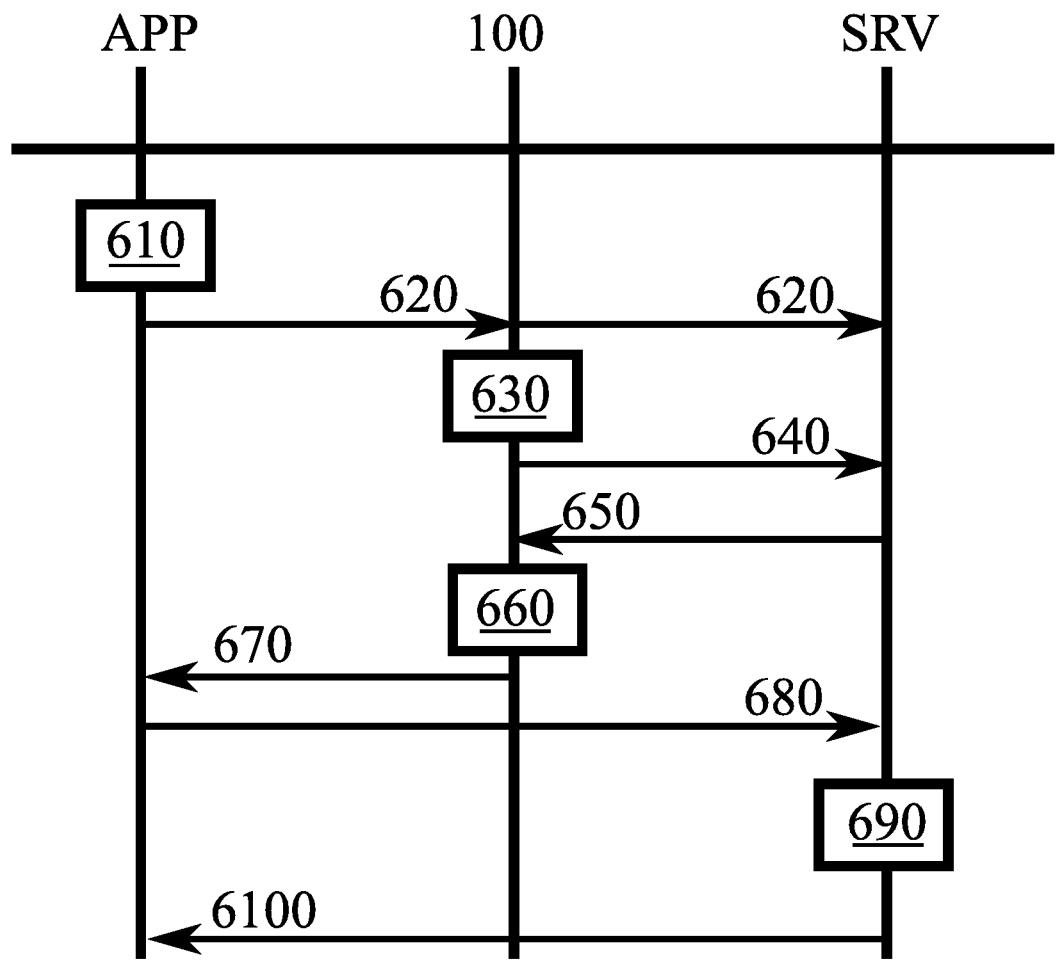
FIG. 6 illustrates signalling in accordance with at least some embodiments.

FIG. 6 illustrates signalling in accordance with at least some embodiments. The process of FIG. 5 leads to attestation to the effect an operating system and/or application software are integral and trustworthy. The verifier will trust the attestation data is accurate, since it is signed by a cryptoprocessor whose key is verifiably secure via the embedded PUF module and the verifier/central authority has the respective challenge-response pairs for the PUF module. On the vertical axes are disposed, on the left, $3^{rd}$ party application APP, in the centre cryptoprocessor 100, for example that of FIG. 1, and on the right, a server SRV. Time advances from the top toward the bottom.

Prior to the process of FIG. 6 beginning, cryptoprocessor 100 and server SRV have been identified and authenticated to each other, or at least cryptoprocessor 100 has been identified and authenticated to server SRV.

In phase 610, the application APP generates a pair of public-key cryptogaphy keys comprising a public key and a private key. The public key and the code that requires attestation is shared with cryptoprocessor 100 and server SRV in phase 620, for example. In phase 630, cryptoprocessor 100 obtains a hash of the code, and requests a challenge from server SRV in phase 640. The hash of the code may be provided to server SRV. Server SRV responsively provides the attestation challenge in phase 650, and cryptoprocessor 100 obtains a response thereto in phase 660, using the PUF module of cryptoprocessor 110. The attestation challenge and its response, the attestation response, perform a similar function as attestation identities in some prior art attestation methods.

Cryptoprocessor 100 then prepares a HMAC of the attestation challenge and the hash of the code to be attested, using the attestation response as key. This is provided to the application in phase 670, and from the application to server SRV in phase 680. Server SRV verifies the HMAC and the server may also check if the code itself is in a database.

Phase 6100 comprises server SRV indicating a result of the checks of phase 690 to application APP.

In the figures, messaging has been illustrated as examples of the processes. As the skilled person will understand, implementations may vary to some extent without departing from the gist of the described processes.

Figure 7:
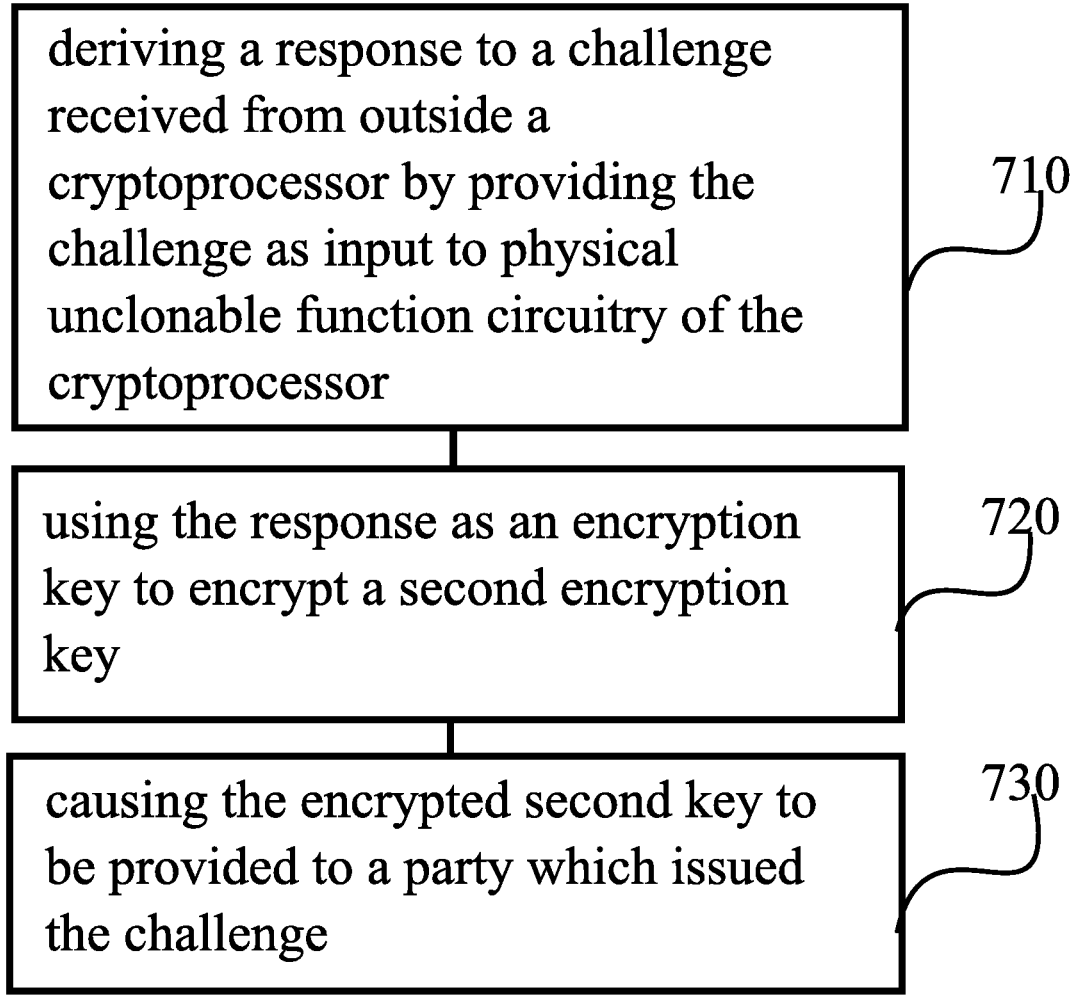
FIG. 7 is a flow graph of a method in accordance with at least some embodiments.

FIG. 7 is a flow graph of a method in accordance with at least some embodiments. The phases of the illustrated method may be performed in cryptoprocessor 100, for example, or in a control device configured to control the functioning thereof, when installed therein.

Phase 710 comprises deriving a response to a challenge received from outside the cryptoprocessor by providing the challenge as input to physical unclonable function circuitry of the cryptoprocessor. Phase 720 comprises using the response as an encryption key to encrypt a second encryption key. Finally, phase 730 comprises causing the encrypted second encryption key to be provided to a party which issued the challenge.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in manufacturing cryptographic circuitry.

ACRONYMS LIST

AI Attestation identity
CRP Challenge-response pair
ECC Error correction coding
HMAC hash-based message authentication code
IEC International Electrotechnical Commission
IoT Internet of Things
ISO International Organization for Standardization
PUF Physical unclonable function
SHA Secure hash algorithm (published versions: SHA-0, SHA-1, SHA-2, SHA-3)
TCG Trusted Computing Group
TPM Trusted Platform Module

REFERENCE SIGNS LIST

100 Cryptoprocessor
101 secure input/output port
110 Cryptographic module
112 PUF module
114 Symmetric encryption engine block
116 Hash engine(s)
118 Key generation module
120 non-volatile memory
130 volatile memory
140 random number generator
150 management module
160 power detection module
170 execution engine
180 authorization module
300-370 Structure of the device of FIG. 3
410-490 Phases of the process of FIG. 4
510-560 Phases of the process of FIG. 5
610-6100 Phases of the process of FIG. 6
710-730 Phases of the method of FIG. 7

CITATION LIST

[1] R. Anderson and M. Kuhn, "Low cost attacks on tamper resistant devices," International Workshop on Security Protocols, LNCS, vol. 1361, pp. 125-136, 1997.
[2] H. Bar-El, "Known Attacks Against Smartcards," Discretix Technologies, http://www.hbarel.com/publications/Known Attacks Against Smartcards.pdf
[3] G. E. Suh, AEGIS: a single-chip secure processor, PhD thesis, Massachusetts Inst. of Technology, August 2005.
[4] T. Xu, J. B. Wendt, and M. Potkonjak, Digital bimodal function: An ultra-low energy security primitive, in International Symposium on Low Power Electronics and Design (ISLPED), September 2013, pp. 292-296.
[5] T. Xu, J. B. Wendt, and M. Potkonjak, Matched digital PUFs for low power security in implantable medical devices, in 2014 IEEE International Conference on Healthcare Informatics, September 2014, pp. 33-38.
[6] M. D. Yu and S. Devadas, Secure and robust error correction for physical unclonable functions, IEEE Design Test of Computers, 27 (2010), pp. 48-65.
[7] M.-D. M. Yu, D. M'Raihi, R. Sowell, and S. Devadas, Lightweight and Secure PUF Key Storage Using Limits of Machine Learning, Springer Berlin Heidelberg, Berlin, Heidelberg, 2011, pp. 358-373.
[8] M. D. M. Yu, R. Sowell, A. Singh, D. M'Raihi, and S. Devadas, Performance metrics and empirical results of a PUF cryptographic key generation ASIC, in 2012 IEEE International Symposium on Hardware-Oriented Security and Trust, June 2012, pp. 108-115.
[9] S. S. Zalivaka, L. Zhang, V. P. Klybik, A. A. Ivaniuk, and C.-H. Chang, Design and Implementation of High-Quality Physical Unclonable Functions for Hardware-Oriented Cryptography, Springer International Publishing, 2016, pp. 39-81.
[10] P. Choi and D. K. Kim, "Design of security enhanced TPM chip against invasive physical attacks," 2012 IEEE International Symposium on Circuits and Systems, Seoul, Korea (South), 2012, pp. 1787-1790.
[11] Dong Li, Huaqun Guo, and Jia Xu. 2016. Enhancing TPM Security by Integrating SRAM PUFs Technology. In Proceedings of the 2nd ACM International Workshop on Cyber-Physical System Security (CPSS '16). ACM, New York, N.Y., USA, 82-93. DOI: https://doi.org/10.1145/2899015.2899023
[12] KIM, M., LEE, H. T., L ING, S., REN, S. Q., TAN, B. H. M., AND WANG, H. 2016. Better security for queries on encrypted databases. IACR Cryptology ePrint Archive 2016, 470.

[13] MUTTI, S., BACIS, E., AND PARABOSCHI, S. 2015. Sesqlite: Security enhanced sqlite: Mandatory access control for android databases. In Proceedings of the 31st Annual Computer Security Applications Conference, Los Angeles, Calif., USA, Dec. 7-11, 2015. 411-420.

[14] DUBEY, G., KHURANA, V., AND SACHDEVA, S. 2015. Implementing security technique on generic database. In Eighth International Conference on Contemporary Computing, IC3 2015, Noida, India, Aug. 20-22, 2015. 370-376.

[15] GUO, Z. AND XU, L. 2015. Research of security structure model for web application systems based on the relational database. IJSN 10, 4, 207-213.

[16] U.S. Pat. No. 8,700,916: Utilizing physically unclonable functions to derive device specific keying material for protection of information

The invention claimed is:

1. A cryptoprocessor comprising:
physical unclonable function circuitry comprising at least one physical unclonable function, and
at least one processing core configured to:
  issue a request for a challenge to a server;
  receive the challenge from the server;
  provide the challenge as input to the physical unclonable function circuitry to derive a response to the challenge;
  use the response as a first encryption key to encrypt a second encryption key;
  cause the encrypted second encryption key to be provided to a the server;
    use the second encryption key to establish a secure end-to-end connection with a correspondent party distinct from the server, and
    wherein the cryptoprocessor is configured to decrypt an encryption key of the correspondent party with a second response as a key to obtain the encryption key of the correspondent party, the second response obtained from the physical unclonable function circuitry using a second challenge as input.

2. The cryptoprocessor according to claim 1, configured to apply a hash-based message authentication code to the second encryption key and at least one object identifier to process a request for object identification, and cause the resulting hash value to be provided as a response to the request for object identification.

3. The cryptoprocessor according to claim 2, wherein the cryptoprocessor is configured to obtain the at least one object identifier from an apparatus the cryptoprocessor is installed in.

4. The cryptoprocessor according to claim 1, configured to provide to the physical unclonable function circuitry an attestation challenge as input to derive an attestation response, to apply hash-based message authentication to the attestation response and an executable of an application, and to provide an output of the hash-based message authentication to the application as a certificate.

5. The cryptoprocessor according to claim 4, further configured to request the attestation challenge from a server.

6. The cryptoprocessor according to claim 5, further configured to receive a public key of the application from the application.

7. The cryptoprocessor according to claim 1, wherein the cryptoprocessor does not comprise circuitry configured to perform asymmetric encryption operations.

8. The cryptoprocessor according to claim 1, further comprising a shared secret, wherein the shared secret is established with the party which issued the challenge, the shared secret is formed with second encryption key, a part of the shared secret is formed with the second encryption key, or the shared secret is shared with the second encryption key.

9. A method in a cryptoprocessor, comprising:
issuing a request for a challenge to a server;
receiving the challenge from the server;
deriving a response to the challenge received by providing the challenge as input to physical unclonable function circuitry of the cryptoprocessor;
using the response as a first encryption key to encrypt a second encryption keys;
causing the encrypted second encryption key to be provided to the server;
using the second encryption key to establish a secure end-to-end connection with a correspondent party distinct from the server and; obtaining an encryption key of the correspondent party by decrypting the encryption key of the correspondent party using a second response as a key, the second response being obtained from the physical unclonable function circuitry using a second challenge as input.

10. The method according to claim 9, further comprising processing a request for object identification by applying a hash-based message authentication code to the second encryption key and at least one object identifier, and by causing the resulting hash value to be provided as a response to the request for object identification.

11. The method according to claim 10, further comprising obtaining the at least one object identifier from an apparatus the cryptoprocessor is installed in.

12. The method according to claim 9, further comprising deriving an attestation response by providing to the physical unclonable function circuitry an attestation challenge as input, applying hash-based message authentication to the attestation response and an executable of an application, and providing an output of the hash-based message authentication to the application as a certificate.

13. The method according to claim 12, further comprising requesting the attestation challenge from a server.

14. The method according to claim 12, further comprising receiving a public key of the application from the application.

15. A non-transitory computer readable medium having stored thereon a set of computer readable instructions that, when executed by at least one processing core of a cryptoprocessor, cause the cryptoprocessor to at least:
issue a request for a challenge to a server;
receive the challenge from the server;
derive a response to a challenge received from outside the cryptoprocessor by providing the challenge as input to physical unclonable function circuitry of the cryptoprocessor;
use the response as a first encryption key to encrypt a second encryption key;
cause the encrypted second encryption key to be provided to the server;
use the second encryption key to establish a secure end-to-end connection with a correspondent party distinct from the server and;
obtain an encryption key of the correspondent party by decrypting the encryption key of the correspondent party using a second response as a key, the second response being obtained from the physical unclonable function circuitry using a second challenge as input.

* * * * *

UNITED STATES PATENT AND TRADEMARK OFFICE
CERTIFICATE OF CORRECTION

PATENT NO. : 11,991,297 B2
APPLICATION NO. : 17/284576
DATED : May 21, 2024
INVENTOR(S) : Dimitrios Schoinianakis and Ian Justin Oliver Page 1 of 1

It is certified that error appears in the above-identified patent and that said Letters Patent is hereby corrected as shown below:

In the Claims

Column 13, in Claim 1, on Line 30, please remove the word "a".
Column 14, in Claim 9, on Line 12, please remove the letter "s" in the word "keys".

Signed and Sealed this
Sixteenth Day of July, 2024

Katherine Kelly Vidal
*Director of the United States Patent and Trademark Office*